United States Patent [19]

Appleby et al.

[11] 4,147,462
[45] Apr. 3, 1979

[54] MACHINE FOR FINISHING VALVE SEATS

[75] Inventors: J. Robert Appleby, Corunna; Frank P. Horvath, Owosso, both of Mich.; William J. Morris, deceased, late of Flint Township, Genesse-County, Mich., by Charles F. Morris, administrator

[73] Assignee: Neway Manufacturing, Inc., Corunna, Mich.

[21] Appl. No.: 845,310

[22] Filed: Oct. 25, 1977

[51] Int. Cl.² ................... B23B 41/12; B24B 19/26
[52] U.S. Cl. ................... 408/80; 51/98 R; 51/125; 51/241 VS; 90/14; 408/81; 408/111
[58] Field of Search ............ 408/79, 80, 82, 707, 408/708, 709, 110, 111, 99, 100; 51/241 VS, 98 R, 90, 125; 90/14

[56] References Cited

U.S. PATENT DOCUMENTS

| | | | |
|---|---|---|---|
| 1,822,649 | 9/1931 | Evans | 51/241 VS |
| 1,831,382 | 11/1931 | Gairing | 51/241 VS |
| 1,924,958 | 8/1933 | Patterson | 51/241 VS |
| 1,950,522 | 3/1934 | Seelert | 51/241 VS |
| 1,960,905 | 5/1934 | Graham | 51/241 VS |
| 1,975,985 | 10/1934 | Stowell | 51/241 VS |
| 2,203,143 | 6/1940 | Haas | 51/241 VS |
| 2,666,307 | 1/1954 | Higert | 51/241 VS |
| 2,908,120 | 10/1959 | Jensen | 51/241 VS |
| 2,977,727 | 4/1961 | Gray et al. | 51/241 VS |
| 3,333,487 | 8/1967 | Parry | 408/80 |

Primary Examiner—Horace M. Culver
Attorney, Agent, or Firm—Blanchard, Flynn, Thiel, Boutell & Tanis

[57] ABSTRACT

A valve-seat cutting machine having a vertically movable support structure with a vertically elongated spindle assembly mounted thereon. The spindle assembly includes an elongated pilot adapted to be axially inserted into a bore formed in an engine block. A cutting tool is rotatably positioned in surrounding relationship to the pilot rod and is driven from a substantially coaxially aligned driving sleeve, which sleeve is connected to the tool by an intermediate coupling which permits substantially universal movement so that the tool can undergo angular and/or lateral misalignment relative to the rotational axis of the driving sleeve. The pilot rod, which moves angularly or laterally with the cutting tool, is also connected by a similar joint structure to an actuator which permits the pilot rod to be slidably moved relative to the cutting tool. A compression transmitting structure extends through the latter-mentioned joint structure to permit a pushing force to be imposed on the pilot rod. The support structure has a locking plate horizontally slidably mounted thereon, which locking plate has a swivel connection with the cutting tool. When the pilot rod has been inserted into the valve bore and the tool has assumed an aligned position relative thereto, in which position the tool may be angularly and/or laterally misaligned relative to the driving sleeve, then a locking actuator is energized to fixedly hold the locking plate in its adjusted position, thereby holding the cutting tool in its adjusted position during the valve-seat cutting operation.

13 Claims, 5 Drawing Figures

MACHINE FOR FINISHING VALVE SEATS

FIELD OF THE INVENTION

This invention relates to an improved machine for finishing valve seats associated with an engine block.

BACKGROUND OF THE INVENTION

Numerous machines have been developed for finishing the valve seats on an engine block, which machines grind or cut the valve seat to permit a conventional valve to be sealingly seated thereon. These known machines have normally provided a movable table such as a cross-slide arrangement, for permitting positioning of the engine block below the seat finishing tool. For accurate positioning of the engine block below the finishing tool, control structure in the form of limit switches and the like have been required. Even still, the required machining tolerances still fall far short of those desired in order to permit the valve seat to be concentrically related to the valve stem bore as formed in the engine block.

To improve upon the finishing tolerances of the valve seat, several machines have been proposed which permit the finishing tool to be angularly and/or laterally moved a limited extent so as to provide for more accurate finishing of the valve seat. Since most engine blocks are cast and are thus subject to substantial dimensional variations, the problem of accurately aligning and finishing the valve seat relative to the bore is thus a long-standing problem. While the known machines have been able to attain fairly good dimensional tolerances, nevertheless there is a long felt need with respect to even further improving or minimizing these tolerances so as to provide for more efficient engine performance and less wear and burning of the valve and valve seat.

One known machine which has attempted to compensate for these inaccuracies is disclosed in U.S. Pat. No. 3,443,399 (Pope et al.) The Pope et al. apparatus provides a rotatable finishing tool supported on an elongated spindle arrangement which possesses a pair of axially spaced universal joints to permit the tool to be misaligned both angularly and laterally through a limited extent. However, the structure of Pope et al. is unduly complex due to the necessity of utilizing a pair of axially spaced universal joints. Further, all of the pushing force as applied to the tool must be transmitted directly through these universal joints, which thereby greatly increases the wear of the joints. Further, the machine of Pope et al. does not have any capability of fixedly locking the tool in a desired angular and/or lateral offset position so as to insure that the tool will remain in this position during the finishing operation.

Another known machine, as disclosed in U.S. Pat. No. 2,116,498 issued to Hall, possesses substantially the same disadvantages as that of Pope et al.

Accordingly, it is an object of the present invention to provide an improved machine for finishing valve seats on an engine block, which machine overcomes the above-mentioned disadvantages and permits efficient finishing of valve seats with a higher degree of accuracy.

A further object is to provide a machine, as aforesaid, which permits the finishing tool to readily adjust for both angular and lateral misalignment of the bore formed in the engine block, and which permits the finishing tool to be locked in its adjusted position whereby it is substantially aligned with the bore in the engine block even though the tool may be both angularly and laterally misaligned relative to its own driving axis, so that the finished valve seat can thus be machined with a much smaller tolerance than previously obtainable.

Still a further object is to provide a machine, as aforesaid, which uses a joint possessing universal movement but which is constructed in such a manner as to readily permit the transfer of the necessary axial pushing force to the finishing tool without causing unnecessary wear of the joint structure.

Another object is to provide a machine, as aforesaid, which employs an independently and separately movable pilot which can be axially extended into the valve bore to insure that the tool assumes the desired angularly and/or laterally offset position so as to be properly aligned with the bore in the valve housing, which pilot can be pressed into the bore independently of the rotatable structure used for driving the tool.

It is also an object to provide an improved machine, as aforesaid, which is desirable for use with engine blocks having several bores formed therein so as to permit the individual tools to be accurately aligned with the respective bores while permitting the simultaneous finishing of valve seats associated with several bores.

Another object is to provide an improved machine, as aforesaid, which is simple and dependable in operation and requires a minimum of maintenance.

Still another object is to provide an improved pilot rod adapted for insertion into the valve stem bore for permitting proper seating of the finishing tool on the rough valve seat.

Other objects and purposes of the invention will be apparent to persons familiar with machines of this general type upon reading the following specification and inspecting the accompanying drawings.

Certain terminology will be used in the following description for convenience in reference only and will not be limiting. For example, the words "upwardly", "downwardly", "leftwardly" and "rightwardly" will refer to directions in the drawings to which reference is made. The words "inwardly" and "outwardly" will refer to directions toward and way from, respectively, the geometric center of the machine and designated parts thereof. Said terminology will include the words specifically mentioned, derivatives thereof, and words of similar import.

SUMMARY OF THE INVENTION

The objects and purposes of the present invention are met by a machine which includes a vertically movable support structure having a vertically elongated spindle assembly mounted thereon. The spindle assembly includes an axially elongated pilot adapted to be axially inserted into a bore formed in an engine block. An annular cutting tool is rotatably positioned in surrounding relationship to the pilot rod. The tool is driven from a substantially coaxially aligned driving sleeve, which sleeve is interconnected to the tool by an intermediate coupling which permits substantially universal movement so that the tool can undergo angular and/or lateral misalignment relative to the rotational axis of the driving sleeve. The pilot rod, which moves angularly or laterally with the cutting tool, is also connected by a similar joint structure to an actuator which permits the pilot rod to be slidably extended and retracted relative to the cutting tool. A further structure permitting transmission of compression loads therethrough, extends through the latter-mentioned universal joint structure to permit a pushing force to be imposed on the pilot rod. The support structure has a locking plate slidably mounted thereon for substantially horizontal movement, which locking plate has a swivel connection with the cutting tool. When the pilot rod has been inserted into a valve bore and the tool has assumed an aligned position with the valve bore, in which position the tool may be angularly and/or laterally misaligned relative to the rotational axis of the driving sleeve, then a locking actuator is energized to thereby fixedly hold the locking plate in its adjusted position relative to the support structure. This thus holds the cutting tool in its adjusted position during the valve-seat cutting operation.

The pilot rod has a tapered shank which permits it to be wedged into the valve stem guide bore so as to insure proper alignment between the cutting tool and the valve seat. The lower end of the pilot rod has an enlarged cylindrical portion formed with a plurality of axial slits extending radially therethrough, whereby this cylindrical portion is resiliently deformable for permitting snug and accurate fitting of the pilot rod within the valve stem guide bore.

DETAILED DESCRIPTION

Figures 1, 2:
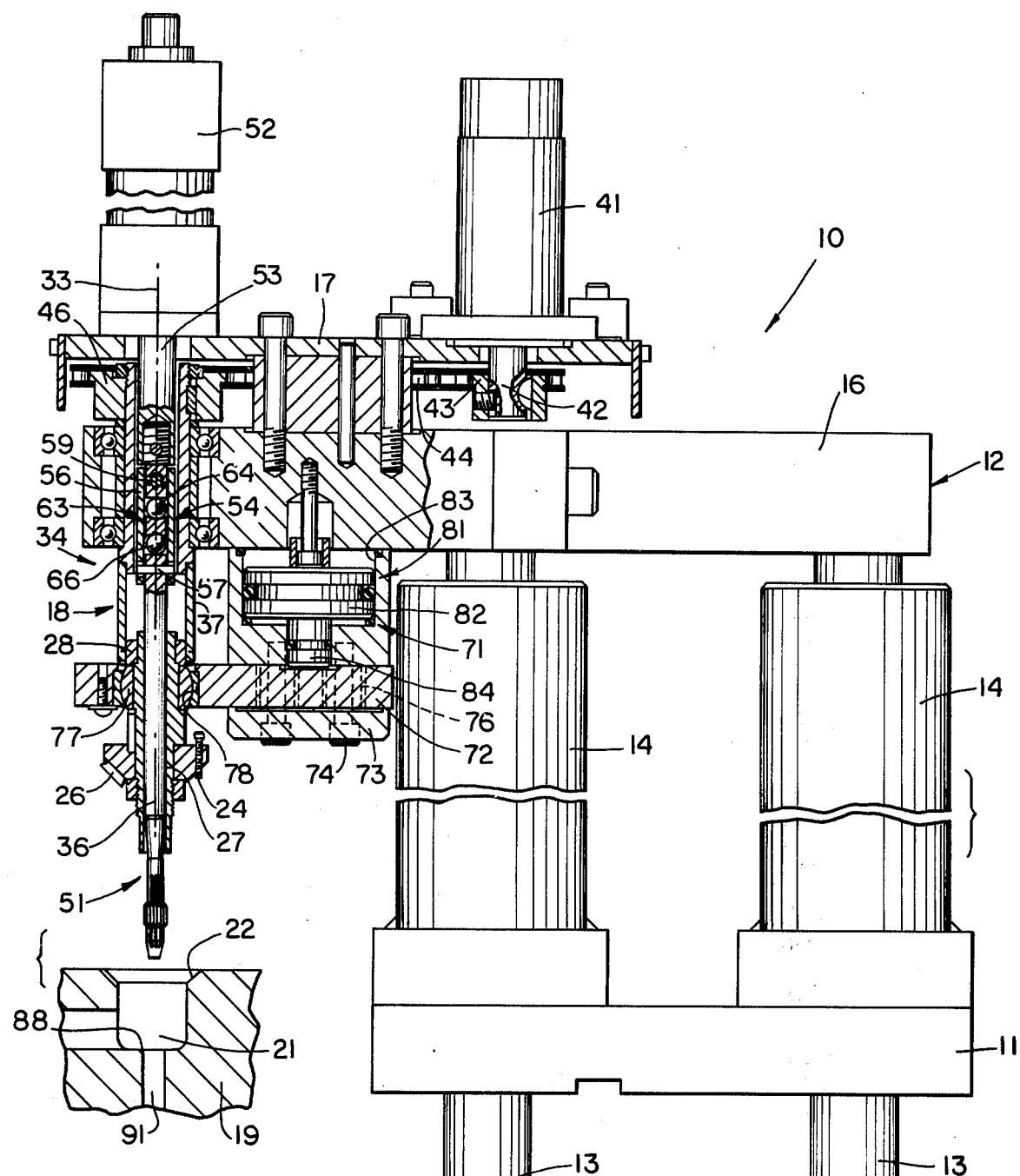
FIG. 1 is a fragmentary elevational view, partially in cross section, of the present invention.
FIG. 2 is a perspective view illustrating one of the members associated with the machine.
Figure 3:
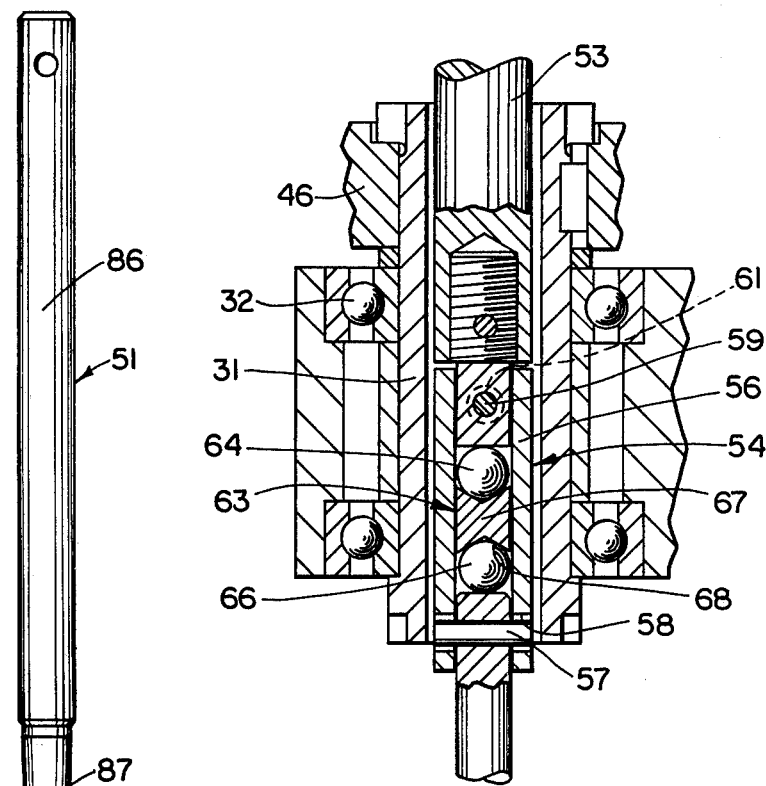
FIG. 3 is an enlarged, fragmentary sectional view of a portion of FIG. 1.

FIG. 1 illustrates therein a machine 10 according to the present invention, which machine includes a stationary frame 11 having a support structure 12 vertically movably supported thereon. The support structure is vertically slidably guided on a pair of guide rods 13, and fluid pressure (i.e. hydraulic) cylinders 14 coact between the frame 11 and the support structure 12 for permitting the latter to be vertically raised and lowered.

The support structure 12, which includes a pair of substantially horizontal plates 16 and 17 fixedly connected together, has a spindle assembly 18 mounted thereon and positioned above a conventional engine block 19, the latter being supported on a suitable part of the overall machine, such as a cross-slide arrangement (not shown). The engine block 19 has a valve stem guide bore 21 formed therein, which valve stem guide bore may be of any conventional configuration and is adapted to have a valve seat 22 of a conventional truncated conical configuration formed at the outer end thereof.

To form or finish the valve seat 22, the spindle assembly 18 includes a rotatable cutting tool 24 which includes an annular cutting head 26 which is fixedly secured to an elongated sleeve 27, the latter having an annular enlarged hub 28 secured adjacent the upper end thereof. The cutting head 26 is, in the present invention, preferably formed according to the structure disclosed in U.S. Pat. No. 3,354,528, although it will be appreciated that the cutting head can be of other conventional structures if desired.

The cutting tool 24 is rotatably drivingly interconnected to a drive sleeve 31 which is rotatably supported on the lower support plate 16 by bearings 32. The drive sleeve 31 is rotatable about its longitudinally extending axis 33 which, in the illustrated machine, extends substantially vertically. Drive sleeve 31 is drivingly connected to the cutting tool 24 by a coupling structure 34 which has a construction providing it with a movement similar to a universal joint so as to permit angular misalignment of the cutting tool 24 relative to the axis 33. This coupling 34 additionally permits the cutting tool to be laterally misaligned relative to the axis 33, which lateral misalignment enables the rotational axis 36 of the cutting head to be radially displaced but remain substantially parallel to the axis 33.

To permit both angular and lateral misalignment of the cutting tool, as explained above, the joint 34 includes an intermediate coupling sleeve 37 which has a pair of diametrically opposed ears 38 projecting axially from the upper end thereof, and a further pair of diametrically opposed ears 39 projecting axially from the lower end thereof. The upper ears 38 project into a pair of diametrically opposite slots which extend axially into the lower end of the drive sleeve 31, and the lower ears 39 similarly project into a further pair of diametrically opposite slots which extend axially downwardly into the hub 28. These slots are all slightly larger than the ears so as to permit the ears to be slightly angularly displaced within the respective slots and to permit the complete sleeve 37 to be slightly laterally (i.e. sidewardly) displaced. Further, the lower ears 39 are angularly displaced by an angle of 90° relative to the upper ears 38, whereby the ears 38 and 39 and their cooperation with the respective slots thus permits the coupling 34 to have a movement similar to a universal joint so that the tool axis 36 can thus be angularly moved to a limited extent relative to the drive axis 33.

As illustrated in FIG. 1, the drive sleeve 31 and hub 28 each have a center annular portion which functions as a pilot and projects into the adjacent end of the coupling sleeve 37 for loosely piloting and guiding same so that the sleeve can not become disconnected, while at the same time permitting the sleeve to undergo the desired angular movement. This coupling sleeve 37, however, even though being angularly displaced, nevertheless permits driving torque to be transmitted therethrough from the drive sleeve 31 to the cutting tool 24.

The drive sleeve 31 is rotatably driven by a rotatable motor means 41 which, in the illustrated embodiment, comprises a conventional electric or fluid-actuated rotary motor which is mounted on the upper support plate 17 and has a rotatable drive shaft 42 projecting therefrom. This drive shaft 42 is drivingly coupled to the drive sleeve 31 by any conventional torque transmitting structure, the latter being a chain drive in the illustrated embodiment. This chain drive includes a driving sprocket 43 nonrotatably coupled to the motor shaft 42 and disposed in engagement with a conventional endless chain 44, the latter in turn being in engagement with a driven sprocket 46 which surrounds and is nonrotatably secured to the drive sleeve 31.

The spindle assembly 18 also includes an elongated guide or pilot rod 51 which is coaxially disposed within and has the cutting tool 24 rotatably supported thereon. The guide rod 51 projects axially downwardly a substantial distance beyond the cutting head 26, and also projects axially upwardly beyond the sleeve 27, whereby the upper end of the guide rod 51 is interconnected to linear motor means 52 which, in the illustrated embodiment, comprises an air fluid pressure cylinder. The cylinder 52 has the housing thereof secured to the upper support plate 17, whereby the linearly movable piston rod 53 is substantially coaxially aligned with and projects into the drive sleeve 31. The piston rod 53 is interconnected to the upper end of the pilot rod 51 by a coupling 54 which also permits both a universal-type angular movement and a lateral movement, similar to the joint 34 as described below.

The coupling 54 particularly includes an intermediate coupling sleeve 56 which is loosely confined within the drive sleeve 31. A first coupling pin 57 is fixed to and extends transversely of the upper end of the pilot rod 51, and the opposite ends of this pin 57 are received within a pair of diametrically opposite openings 58 formed through the wall of the coupling sleeve 56 adjacent the lower end thereof. A similar coupling pin 59 is secured to the lower end of the piston rod 53 and extends through similar opposed openings 61 formed through the wall of the coupling sleeve 56 adjacent the upper end thereof. The coupling pins 57 and 59 extend at right angles to one another to thereby provide a substantially universal coupling between the piston rod and the pilot rod. Further, the openings 58 and 61 are of a diameter somewhat larger than that of the respective pins to thereby provide an annular clearance therebetween, which clearance permits lateral (i.e., sideward) displacement of the pilot rod 51 relative to the piston rod 53, either independently or in conjunction with the angular misalignment therebetween.

The coupling 54, in addition to permitting angular and/or lateral misalignment between the pilot rod and the piston rod, also permits an upwardly-directed axial pulling force to be imposed on the pilot rod 51 when same is being moved upwardly away from the engine block. However, since movement of the pilot rod into the engine housing is normally performed under a substantial downwardly directed axial pressure so as to firmly seat the pilot rod within the valve bore, the present invention also provides a compression transmitting structure 63 between the piston rod and the pilot rod. This compression transmitting structure 63 includes an upper spherical bearing member 64 which bears against the lower end of the piston rod, and a lower spherical bearing member 66 which bears against the upper end of the pilot rod. These upper and lower spherical bearing members in turn have an intermediate substantially cylindrical bearing element 67 disposed therebetween, which element 67 is guidably confined within the coupling sleeve 56. The axially opposite ends of this bearing cylinder 67 are provided with suitable concave recesses 68 therein, which recesses are of a substantially conical configuration in the illustrated embodiment, so as to maintain the spherical bearing elements properly centered. This compression structure 63 enables substantially large compression forces to be exerted from the piston rod 53 onto the pilot rod 51 when same is being pressed into the valve bore 21, while at the same time this compression structure permits the pilot rod to angularly and/or laterally move relative to the piston rod.

To permit the lower spindle assembly (i.e., the cutting tool and the pilot rod) to be fixedly maintained in an angularly and/or laterally misaligned position relative to the driving axis 33, there is provided a locking structure 71 which can be selectively engaged or released. This locking structure 71 includes a substantially horizontally movable locking plate 72 which is slidably supported on a stationary guide plate 73. This latter guide plate 73 is fixedly connected to support plate 16 by a plurality of bolts 74 which extend through enlarged holes 76 formed in the locking plate. The locking plate 72 is also connected to the cutting tool by means of a swivel structure which includes a substantially spherical bearing sleeve 77 which surrounds and is fixedly secured to the cutting tool 24 and is guidably received within a suitable substantially spherical recess 78 formed in the locking plate. The locking plate 72, due to the swivel connection with the cutting tool, permits the cutting tool to angularly and/or laterally move due to the permissible horizontal sliding movement of this locking plate 72 on the guide plate 73.

The locking plate 72 can be suitably fixed in position by a lock actuator 81 which, in the illustrated embodiment, comprises a fluid pressure cylinder 82 which is vertically slidably confined within a bore 83. This pressure cylinder has a downwardly projecting locking rod 84 which is adapted to be moved into engagement with the upper surface of the locking plate 72 to thereby fixedly hold same in position. A pressure fluid such as hydraulic fluid is selectively supplied to the opposite sides of the piston so as to selectively move the locking rod upwardly or downwardly as desired.

Figure 4:
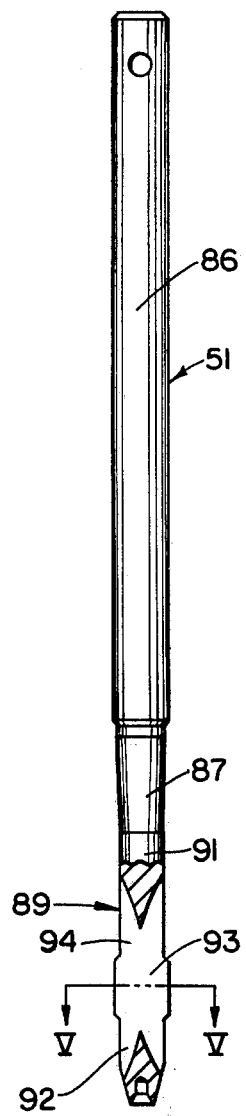
FIG. 4 is a side view of the improved pilot rod.
Figure 5:
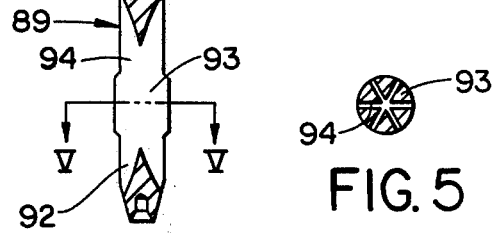
FIG. 5 is a sectional view along line V—V in FIG. 4.

Referring now to FIGS. 4 and 5, there is illustrated the improved pilot rod 51 of the present invention, which pilot rod is preferably utilized in conjunction with the machine 10. It will be appreciated, however, that other pilot rods of conventional configuration can be utilized with the machine 10 if desired.

The pilot rod 51, as conventional, includes an elongated cylindrical shank 86 which terminates in a truncated conical wedge portion 87. This wedge portion is adapted to be pushed against the shoulder 88 within the valve guide bore 21 so as to permit proper seating and alignment of the pilot rod therein. This conical portion 87 in turn terminates in an elongated reduced diameter holding part 89 which is adapted to be disposed within the valve stem bore 91. This holding part 89 includes a pair of equal-diameter hubs 92 which are axially spaced apart, the upper hub terminating in the conical wedge portion and the lower hub terminating in a tapered tip. These hubs 92 are of a diameter slightly smaller than that of the valve stem bore 91. Hubs 92 are joined together by an intermediate hub 93 which is of slightly larger diameter and preferably is of a diameter slightly greater than or substantially equal to that of the valve stem bore 91 so as to effectively create an interference fit therewith. A plurality of circumferentially spaced, axially elongated slits 94 are formed radially through the hub 93, and these slits extend into the adjacent hubs 92. These slits, there being three uniformly spaced apart slits in the illustrated embodiment, result in the formation of elongated springlike plates which enable the hub 93 to be radially compressed when the pilot rod is inserted into the valve stem bore 91 so as to result in a snug and secure fit within this bore.

OPERATION

Assuming that the machine 10 is positioned as illustrated in FIG. 1 and that an engine block 19 is disposed below the spindle assembly 18, then the air cylinder 52 is energized by supplying a relatively high pressure air to the upper end thereof. This causes the pilot rod 51 to be rapidly projected downwardly into the valve guide bore 21 so that the resilient hub 93 is seated within the valve stem bore 91 and the wedge portion 87 is pushed against the shoulder 88, whereby the pilot rod is thus securely seated and properly aligned within the valve stem bore 21. The pressurized air is then relieved from both ends of air cylinder 52, whereby pilot rod 51 which is already snugly seated within the valve stem bore is thus free from any axially imposed force which might tend to misalign the pilot rod. Hydraulic cylinders 14 are then energized to cause the support structure 12 to be lowered at a relatively rapid rate, which lowering causes the cutting-tool 24 to be moved downwardly toward the engine block. During this downward movement of the support structure 12, and of the cutting tool mounted thereon, the cutting tool slides axially downwardly relative to the stationary pilot rod 51. The cutting tool is moved downwardly until it is spaced closely adjacent the valve seat 22, being spaced therefrom by an extremely small distance which normally is in the order of a few thousandths of an inch (for example, 0.002 inch). When reaching this position, the support structure is stopped. The rotary drive motor 41 is then energized to cause rotation of the drive sleeve 31 and of the cutting tool 24, thereby eliminating any misalignment between the cutting tool and the valve bore due to friction existing within the system. During the above-mentioned seating of the pilot rod and valve cutter relative to the valve stem bore, the locking plate 72 is horizontally displaced and positioned as necessary in order to accommodate the misalignment, either lateral and/or angular, of the spindle assembly. This lateral and/or angular misalignment of both the pilot rod and cutting tool relative to the drive axis 33 is permitted by the coupling structures 54 and 34, respectively. Thereafter, the locking piston 82 has hydraulic pressure fluid supplied to the upper surface thereof so that same is moved downwardly into an energized locking position, thereby clampingly holding the locking plate 72 in its adjusted position. The lower spindle assembly is now unable to move out of its angular and/or laterally misaligned position, whereby it is thus lockingly held in the desired aligned relationship with the valve guide bore 21. Cylinders 14 are now energized to cause further lowering of the support structure 12 and of the spindle assembly 18 mounted thereon, which lowering occurs at a relatively slow rate so that the rotatable cutting tool 26 is thus moved against and fed into the valve seat 22 so as to cut and finish the desired annular valve seat surface. This downward feeding of the cutting tool is relatively small, such as approximately 0.010 inch.

After the cutting tool has been moved through the desired feed stroke so as to cut the valve seat, as described above, then the pressure cylinders 14 are reversely energized to cause a rapid upward lifting of the support structure 12, and air cylinder 51 is also reversely energized to pull the pilot rod 51 upwardly out of the valve stem bore, thereby causing the cutter head and pilot rod to retract into the uppermost position illustrated in FIG. 1. The rotary motor 41 is also deenergized to thereby stop the rotation of the cutter head.

The control over the driving and movement of the support structure and spindle assembly utilizes conventional hydraulic and electrical controls, such as limit switches, pressure switches and the like so as to permit the hydraulic cylinders 14 to cause a fast advance and retract of the support structure, and a slow advance thereof during the feed stroke. Control systems of this type are conventionally utilized and may assume many different forms and variations.

While the above description relates to a single spindle assembly, it will be appreciated that the machine of this invention can also be provided with two or more identical spindle assemblies mounted thereon, with this plurality of spindle assemblies all being mounted on the vertically movable support structure. In this manner, the plurality of spindles can be positioned for cooperation with a plurality of valve bores associated with an engine block so as to permit simultaneous grinding of several valve seats.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a valve-seat finishing machine, including a frame, a head structure slidably supported on said frame for linear reciprocating movement along a selected direction, and at least one spindle assembly mounted on said head structure and extending substantially parallel to said selected direction for permitting finishing of a valve seat, said spindle assembly including a driving member supported for rotation about a driving axis which is substantially parallel with said selected direction, a tool which is substantially aligned with said driving member and is rotatable about a tool axis which is approximately aligned with said driving axis, and coupling means drivingly connecting said driving member to said tool (1) for permitting driving of said tool and (2) for permitting said tool axis to move into an adjusted position wherein it is angularly and laterally misaligned with respect to said driving axis, the improvement comprising releasable locking means for selectively holding said tool in said adjusted position, whereby rotation of said tool effects finishing of the valve seat.

2. A machine according to claim 1, wherein said locking means includes a locking member slidably supported on said head structure and being movable in a direction substantially perpendicular to said driving axis, said locking member and said tool having a swivel structure connected therebetween for permitting the tool to move into a misaligned position relative to said driving axis, and releasable means coacting with said locking member for fixedly holding same in a selected position.

3. A machine according to claim 2, wherein said releasable means includes fluid pressure cylinder means cooperating with said locking member for fixedly holding same in said selected position.

4. A machine according to claim 1, wherein said spindle assembly includes an elongate pilot rod positioned coaxially slidably supported within said tool, said driving member comprising a rotatable driving sleeve, a drive member axially slidably supported within said driving sleeve, and second coupling means connecting said drive member to said pilot rod for permitting transmission of axial force therebetween, said second coupling means permitting the pilot rod to be both angularly and laterally misaligned relative to the longitudinal axis of said drive member.

5. A machine according to claim 4, including compression-force transmitting means coacting between said drive member and said pilot rod for permitting a pushing force to be transmitted therethrough from said drive member to said pilot rod, said compression-force transmitting means being independent of said second coupling means.

6. A machine according to claim 5, wherein each of said first-mentioned and second coupling means includes only a single universal-type joint for permitting said angular misalignment, said universal-type joint including cooperating elements having lateral clearances therebetween for permitting said lateral misalignment.

7. A machine acccording to claim 1, wherein said coupling means includes only a single universal-type joint for permitting said angular misalignment, said universaltype joint including cooperating structural elements having lateral clearances therebetween for permitting said lateral misalignment.

8. A spindle assembly, particularly for finishing a valve seat, comprising in combination:

a support;

an annular drive means rotatably supported on said support for rotation about a drive axis;

annular tool means rotatable about a finishing axis and disposed adjacent one end of said annular drive means, said annular tool means being approximately aligned with said annular drive means;

first coupling means structurally and drivingly conecting said tool means to said drive means for permitting said tool means to be (1) rotatably driven from said drive means and (2) both angularly and laterally misaligned relative to said drive means;

elongate rodlike pilot means coaxially and slidably disposed within said annular tool means, said rod means projecting axially outwardly beyond said tool means;

linear reciprocal driving means coaxial with and slidably supported within said annular drive means; and second coupling means connected between said pilot means and said reciprocal driving means for permitting said pilot means to be (1) axially slidably displaced responsive to axial displacement of said driving means and (2) both angularly and laterally misaligned relative to said drive axis so that the pilot means follows the misalignment of the annular tool means.

9. An assembly according to claim 8, including compression transmitting means coacting between said reciprocal driving means and said pilot means solely for transmission of pushing force from said drive means to said rod means, said compression transmitting means being independent of said second coupling means.

10. An assembly according to claim 8, wherein each of said first and second coupling means includes only a single universal joint means for permitting said angular misalignment, each said universal joint means including cooperating structure having lateral clearances therebetween for permitting said lateral misalignment.

11. An assembly according to claim 10, including a stationary frame, said support being mounted on said frame for linear reciprocating movement in a direction substantially parallel with said drive axis, a rotatable drive motor mounted on said support and drivingly interconnected to said annular drive means for selectively rotating same, and a linear drive motor mounted on said support and drivingly connected to said reciprocal driving means for slidably displacing same.

12. An assembly according to claim 11, including locking means mounted on said support and cooperating with said annular tool means for fixedly holding same in its angularly and/or laterally misaligned position.

13. An assembly according to claim 12, including compression transmitting means coacting between said reciprocal driving means and said pilot means for transmission of pushing force from said driving means to said rod means, said compression transmitting means being independent of said second coupling means.

* * * * *